Aug. 19, 1969 K. S. SIKORSKI 3,462,556

CALLING LINE TERMINAL IDENTIFIER

Filed April 26, 1966 9 Sheets-Sheet 1

INVENTOR
K. S. SIKORSKI
BY
[signature]
ATTORNEY

Aug. 19, 1969 K. S. SIKORSKI 3,462,556

CALLING LINE TERMINAL IDENTIFIER

Filed April 26, 1966 9 Sheets-Sheet 2

Aug. 19, 1969 K. S. SIKORSKI 3,462,556

CALLING LINE TERMINAL IDENTIFIER

Filed April 26, 1966 9 Sheets-Sheet 4

GROUP START CIRCUIT
(FDR GP 0)

Aug. 19, 1969 K. S. SIKORSKI 3,462,556

CALLING LINE TERMINAL IDENTIFIER

Filed April 26, 1966 9 Sheets-Sheet 6

Aug. 19, 1969 K. S. SIKORSKI 3,462,556

CALLING LINE TERMINAL IDENTIFIER

Filed April 26, 1966 9 Sheets-Sheet 7

IDENTIFICATION

LINE FINDER IDENTIFICATION BANK MULTIPLE

United States Patent Office 3,462,556

Patented Aug. 19, 1969

3,462,556

CALLING LINE TERMINAL IDENTIFIER

Karol S. Sikorski, Old Bridge, N.J., assignor to Bell Telephone Laboratories, Incorporated, New York, N.Y., a corporation of New York Filed Apr. 26, 1966, Ser. No. 545,497
Int. Cl. H04m 3/18
U.S. Cl. 179—18 16 Claims

ABSTRACT OF THE DISCLOSURE

A modified 200-point, four-wire, step-by-step telephone system line finder is disclosed with circuitry whereby a three-wire line circuit is identifiable as to its four digit number by virtue of its location in the terminal bank by using the pair of wipers usually employed for line meter control. Two line circuits having the same tens and units digits terminate at the same bank location. The particular finder used identifies the hundreds and thousands digits. An identification signal is applied through two diodes to the pair of meter lead brushes and thence to the pair of meter lead bank contacts. The diodes prevent undesirable multiple signal paths which would otherwise be present due to the usual finder bank line multiple. The upper meter bank contact of each line having the same tens digit is connected to the appropriate one of ten tens leads. The lower meter lead bank contact of each line having the same units digit is connected to the appropriate one of ten units leads. The tens and units digits are identified by detecting which tens and units leads are carrying the signal.

The present invention relates generally to calling line identification, more particularly to identifying a calling line by means of its terminal location in a line switch, and specifically to identifying a calling line through the agency of its location in the terminal bank of a line finder.

A line switch or a line finder, such for instance as found in step-by-step telephone switching systems, generally comprises a bank of line terminals arranged in coordinate levels and rows with a brush assembly capable of being moved to a terminal position or bank location to make contact with a line terminal located thereat. Each terminal ordinarily includes at least three bank contacts to which are connected the usual tip, ring and sleeve conductors of a line circuit. Similarly, the brush assembly ordinarily includes at least three wipers arranged to make contact with the three bank contacts of one line terminal at a time. As is well known, a fourth terminal bank contact may be provided to be connected to the message register conductor (also referred to as the meter lead) of a line circuit when message register control is required; and, a fourth brush wiper may be included for making contact with the fourth bank contact.

Line finders, particularly in step-by-step systems, usually include a terminal bank having one hundred line terminals arranged in ten horizontal levels and ten vertical rows, the vertical and rotary movements of the brush assembly thus conforming to the decimal system of pulsing, namely from one to ten pulses per digit, upon which the control of selectors and connectors of the system is based. Such a line finder is known in the art as a 100-point line finder. It is known as a three-wire finder if only tip, ring and sleeve conductors are involved. It is known as a four-wire finder if a fourth conductor, such as a meter lead, is also involved, et cetera.

Also well known are so-called 200-point step-by-step line finders wherein each of the one hundred line terminal locations in the bank consists of two sets of bank contacts. Two line circuits may thus be terminated at each bank terminal location. In such finders, the brush assembly consists of two sets of wipers, one set to contact one set of bank contacts and the other set to contact the other set of bank contacts. Such finders include circuitry for ascertaining which of the two lines at a terminal location is the calling line and for rendering effective at any one time only certain of the wipers according to which of the lines is the calling line.

In order to single out or to identify one line termination in an entire central office of typically 10,000 lines, each termination may be assigned a unique four-digit number from 0000 to 9999, which may or may not be the actual four numericals of the line's directory number. Where 100-point finders are used, each terminal of a finder may have a different two-digit number from 00 to 99 which may be the tens and units digits of the four-digit number. Different finder groups will serve different groups of 100 lines; thus, a signal from any finder of a group may be used to determine the hundreds digit. Likewise, different finder supergroups will serve different groups of 1,000 lines, thus allowing a signal from any finder of a supergroup to determine the thousands digit.

Where 200-point line finders are used, each terminal location in the finder bank may terminate two lines which have the same tens and units digits but different hundreds digits. In this case a signal from the finder can determine the hundreds digit by virtue of the finder knowing whether it is dealing with one line termination or the other at a particular bank location.

The present invention contemplates a line finder wherein each line terminal location in the terminal bank of the finder has at least one pair of identification bank contacts and wherein the brush assembly has at least one pair of wipers adapted to make contact with the pair of identification bank contacts at one time, a source of signal, means for applying the signal to the pair of wipers when the brush assembly is in contact with a line terminal, and means for ascertaining which pair of identification bank contacts has the signal applied thereto, thus to identify the line terminal location in the bank.

One feature of the present invention is the assignment of tens and units digits of a line terminal number according to the coordinate position of that terminal location in the bank of at least one finder of the finder group, where the pair of contacts involved are the usual upper and lower contacts of a bank structure. This enables all upper identification bank contacts in a row or level of that finder to be multiplied and all lower identification bank contacts in the other of the row and level of that finder to be multiplied, whereby the signal from the two wipers will appear on one level multiple and one row multiple to provide "tens" and "units" digit information.

Another feature of the present invention is the provision of two line circuit terminations at the same bank location, where both lines have the same tens and units digits but different hundreds digits, and means in the finder for identifying the pertinent hundreds digits.

Another feature of the invention is the provision of means in the finder to allow effective transmission of the signal in the direction from the source thereof to the pair of wipers and to prevent effective transmission of the signal in the reverse direction, thereby to preclude undesirable multiple signal paths due to the usual line multiple in the banks of a plurality of finders of a group.

The exemplary embodiment used herein to illustrate the features of the invention is a modified 200-point, four-wire, step-by-step telephone system line finder with associated circuitry whereby a three-wire line circuit is identifiable by virtue of its location on the terminal bank by using the brush wipers usually employed for message register or line meter control.

FIG. 1 of the drawing is a block diagram of a telephone switching system wherein the present invention may be used;

GENERAL DESCRIPTION

Figure 1:
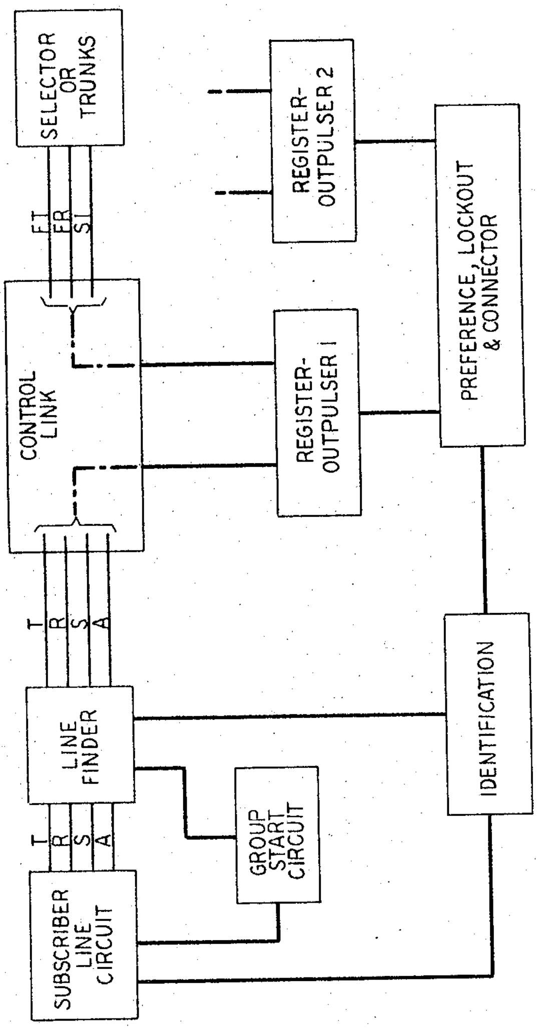

The block diagram of FIG. 1 illustrates the basic functional parts of a common control step-by-step switching system as an exemplary embodiment illustrating the utility of the present invention. Such a common control step-by-step system is disclosed in detail in G. Riddell patent 3,413,422 of Nov. 26, 1968, which is referred to hereinafter as the Riddell disclosure. In accordance with the Riddell disclosure, when a call is initiated from a subscriber line circuit, the group start circuit usually associated with line finder operation causes a line finder to find this calling line and to cause the control link to select an idle register-outpulser for controlling the call. The register-outpulser will split the connection between the line finder and the first selector of the switch train in order to receive dialing instructions from the calling line and to control the outgoing switch train in accordance with these instructions. When the outgoing switch train connection has been completed the register-outpulser will release, allowing the control link to establish a through-transmission condition between the line finder and the first selector.

The block diagram of FIG. 1 shows a preference, lock-out and connector circuit to which access is shown from two register-outpulsers intended to be representative of a plurality of such common control circuits. At a suitable time, preferably during the initial stages of the common control operation, the register-outpulser will bid through the preference, lock-out and connector circuit for the services of an identification circuit in order to secure an identification of the calling line terminal number in accordance with the present invention. The Riddell disclosure does not include the identification or preference, lock-out and connector circuitry of FIG. 1. The detailed description to be provided below describes a modified line finder, some modification to the register-outpulser of the Riddell disclosure, a typical identification circuit, and enough details of a preference, lock-out and connector to enable an understanding of the present invention.

According to the present invention, when the register-outpulser is ready to effect the identification procedure it will, as above metnioned, seize the identification circuit through the preference, lock-out and connector. The seizure of the identification circuit will cause a signal to be transmitted therefrom through the preference, lock-out and connector and through the register-outpulser into the control link, thence over conductor A into the line finder where this signal will be caused to appear across two wipers of the brush assembly of the line finder to cause a registration in the identification circuit of the line terminal identity of the calling line. This identity information will then be transferred to the register-outpulser, which may thereupon release the identification circuit and the preference, lock-out and connector so that these circuits may be used by another register-outpulser.

Figure 2:
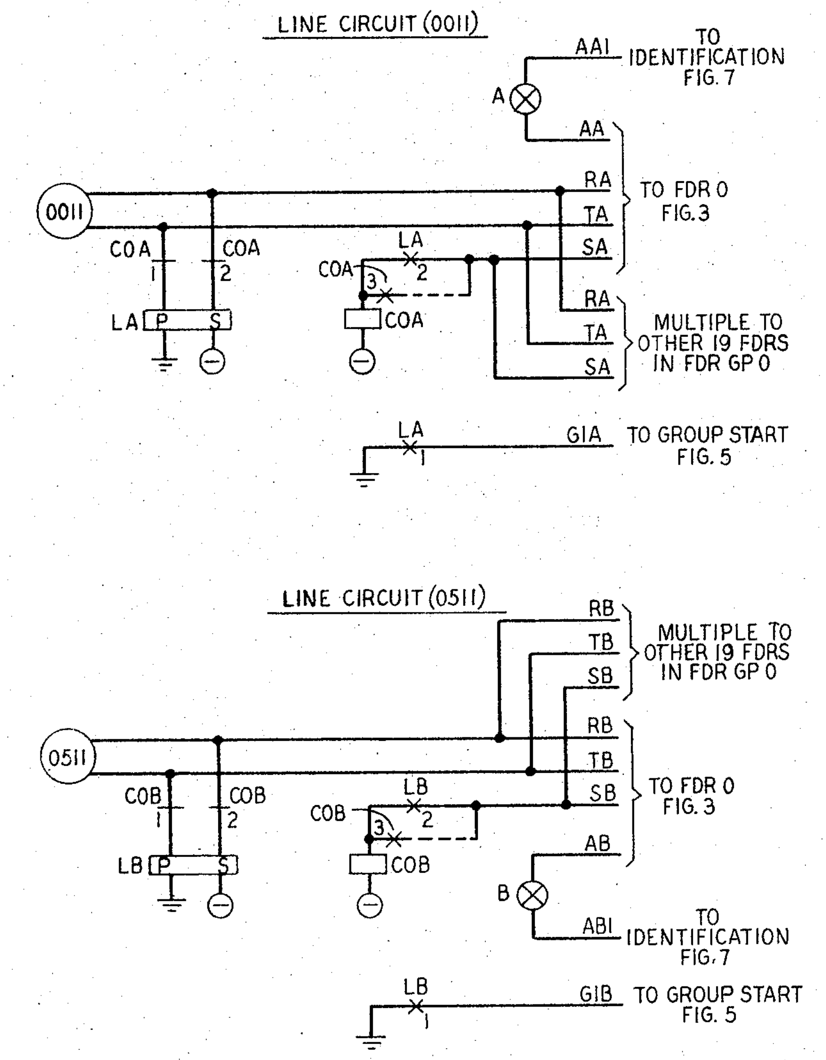
FIG. 2 shows two typical line circuits.
Figure 3:
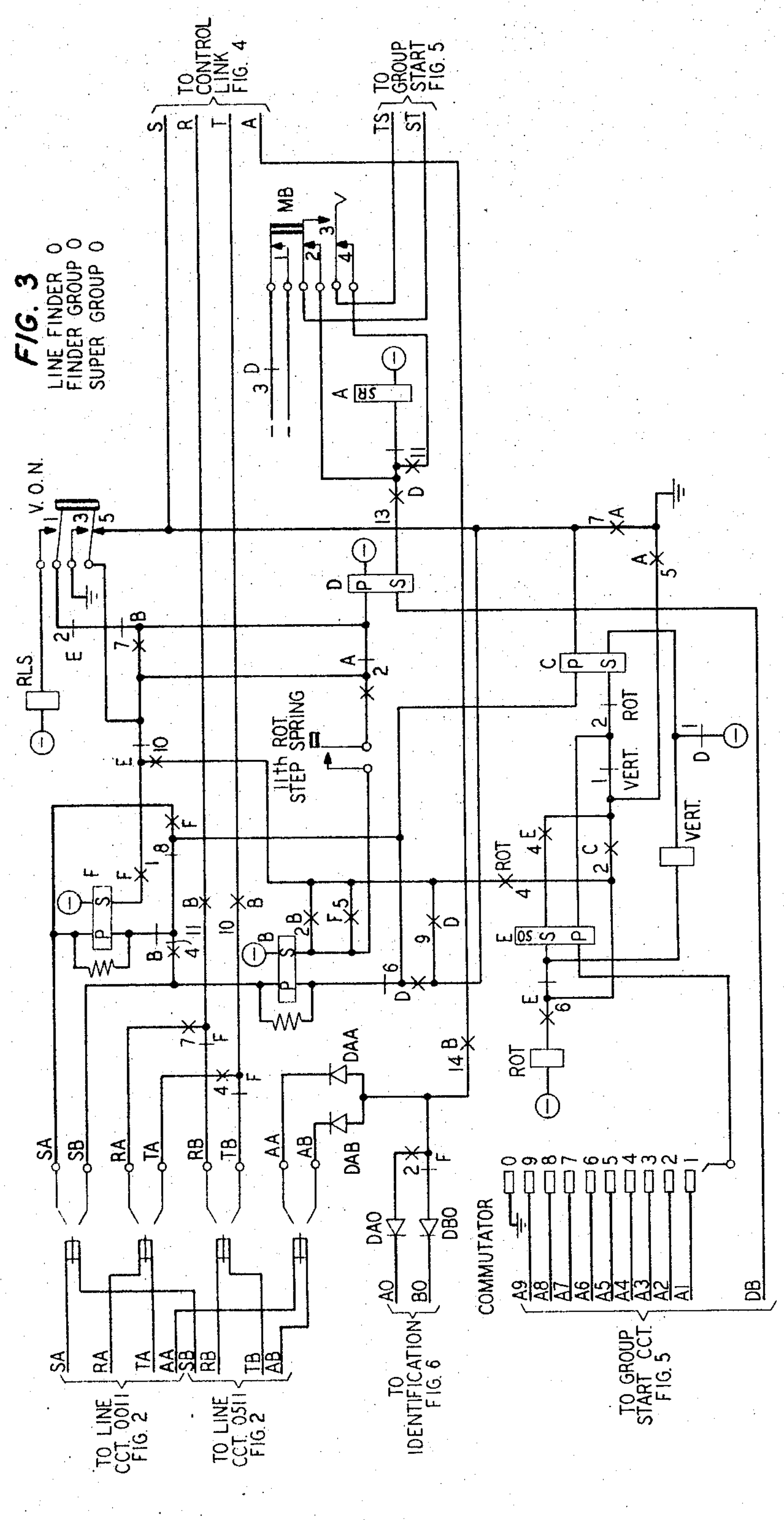
FIG. 3 shows a modified 200-point, four-wire line finder in the terminal bank of which the two line circuits of FIG. 2 terminate in various of the upper and lower bank contacts at the same bank location.

In the finder circuitry of FIG. 3 the two line circuits (see FIG. 2) 0011 and 0511 are shown terminating in terminal bank contacts at the same bank location for the finder of FIG. 3. As is well known, of course, the finder bank actually is made up of four separate parts, each containing one pair of contacts and cooperating with one pair of wipers; but, the four wipers move as a unit so that at any one time each wiper pair is at the same relative location in its own part of the entire bank. In the schematic showing of FIG. 3, the sleeve conductor SA from line circuit 0011 of FIG. 2 terminates in the upper sleeve bank contact of the top or upper pair; whereas, the sleeve conductor SB of line circuit 0511 of FIG. 2 terminates in the lower sleeve contact of this top or upper pair. The tip and ring conductors TA and RA of line circuit 0011 terminate in the respective lower and upper contacts of the second from the top pair of bank contacts, the tip and ring conductors TB and RB of line circuit 0511 terminate in the respective lower and upper contacts of the next to bottom pair, and the identification leads AA and AB of these two respective lines terminate in the upper and lower contacts of the bottom pair of identification bank terminals. As is well known in line finder operation, if the line finder of FIG. 3 ascertains that line circuit 0011 is the calling line, then both of the relays F and B of FIG. 3 will be operated; whereas, if line circuit 0511 is the calling line, then relay B will be operated and relay F will remain released. When the identification signal appears in FIG. 3 on conductor A (from FIG. 4), it will pass through make contact 14 of relay B (operated in both cases), thence through the two diodes DAA and DAB, over the wipers AA and AB, over both of the contacts of the lower pair of bank terminals, and thence to conductors AA and AB extending respectively to the two line circuits of FIG. 2. Also, this signal will extend in FIG. 3 over either make contact 2 or break contact 2 of relay F and thence through either diode DA0 or DB0 to one of the two conductors A0 and B0 extending into the identification circuit of FIG. 6. Referring to FIG. 2, conductors AA and AB from the line finder of FIG. 3 are connected to punchings A and B of the associated line circuits and thence to conductors AA1 and AB1 extending into the identification circuit of FIG. 7. In FIG. 7 these two conductors AA1 and AB1 are shown connected to respective tens conductor T1 and units conductor U1, thereby to identify both of these line circuits as involving the same tens and units digits 11 in their line terminal identification number. This, as will be obvious from the previous description, is because both of these line circuits appear at the same line finder bank location. It will be obvious that leads AA and AB from the finder of FIG. 3 could be connected directly to conductors T1 and U1 of the identification circuit of FIG. 7, instead of being physically associated with or part of any line circuits per se. In the meantime, as will be explained in more detail subsequently, the grounded conductor A0 or B0 from FIG. 3 into FIG. 6 will be extended through suitable diodes to conductor A or conductor B to identify which of the two line circuits the identification process is concerned about so as to help to identify whether the second digit of the line number 0011 or 0511 is a zero or a five. Also, in FIG. 6 it will be seen that the ground on conductor A0 or B0 will also cause the energization of conductors G0 and LG0. Conductor G0 will indicate which of the five line finder groups is involved, thereby, with the concurrent grounding of lead A or lead B in FIG. 6, to resolve whether the hundreds digit is a 0 or a 5. Furthermore, the energization of conductor LG0 in FIG. 6 will cause the identification of one of the ten possible line groups (supergroups) in a 10,000 line office, thereby identifying the first or thousands digit zero of the line circuit number.

Figure 6:
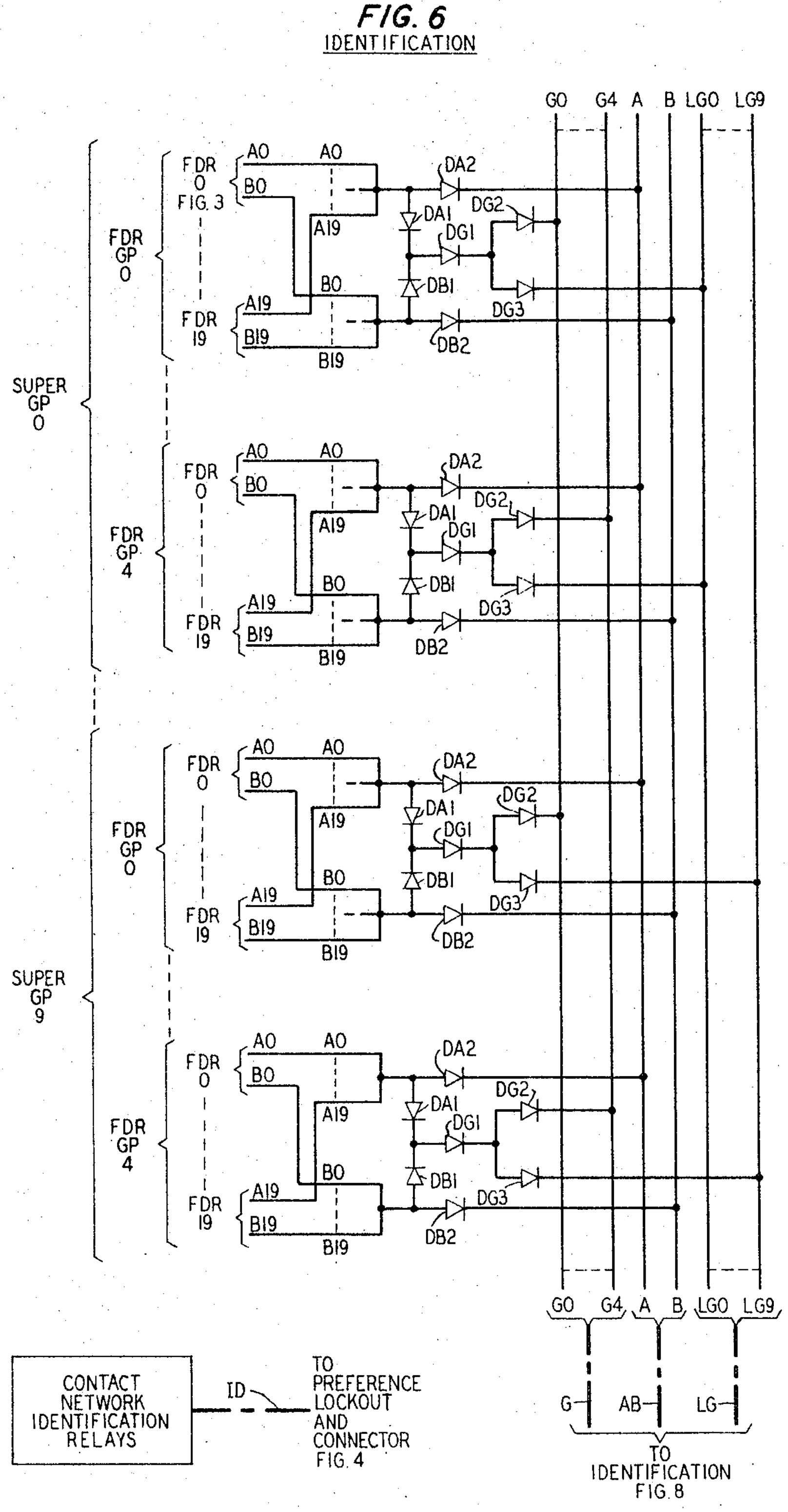
FIGS. 6, 7 and 8 show Identification circuitry whereby the signals supplied by the Finder of FIG. 3 are resolved into the line terminal number; and, FIG. 9 shows the preferred manner of multipling the upper and lower identification bank contacts in one finder of a finder group.
Figure 7:
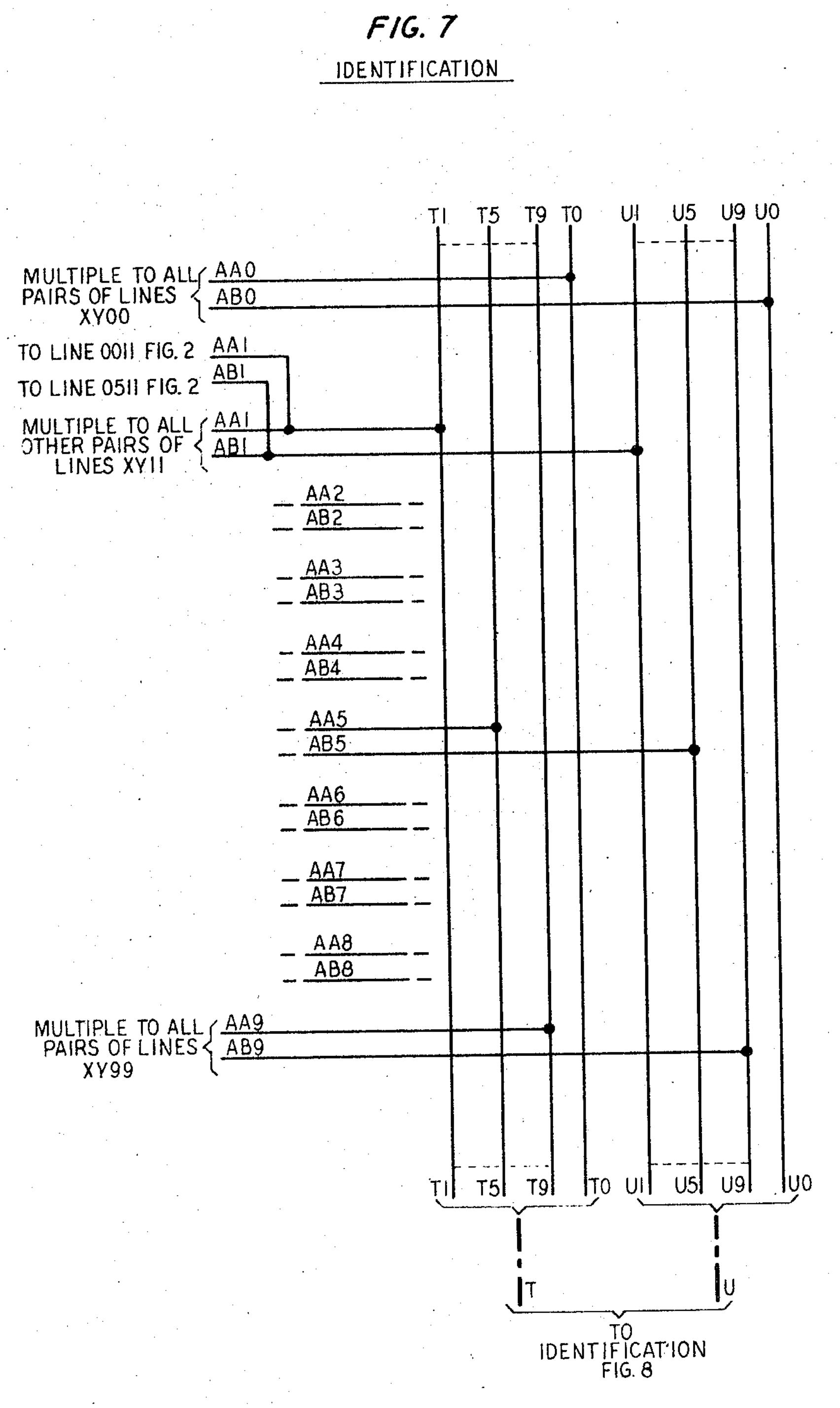
Figure 8:
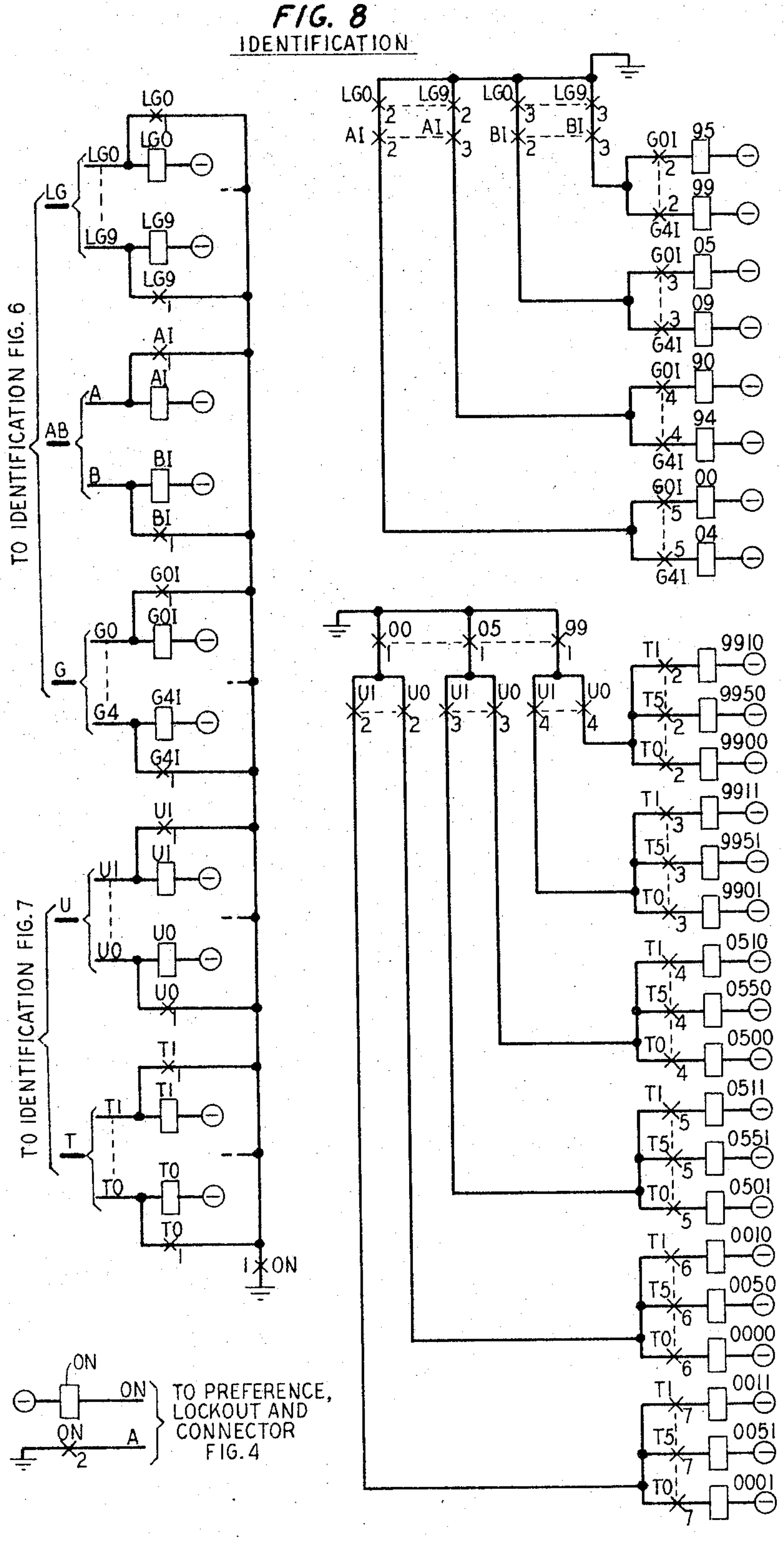

This identity information will extend from FIG. 6 and FIG. 7 over cables G, AB, LG, T and U into the identification circuit of FIG. 8 where these indications will be manifested in the operation of one of a number of relays, such as relay 0011 in the lower right-hand portion of FIG. 8, which indicates the identity of the calling line. In the bottom left-hand corner of FIG. 6 a box designated "Contact Network Identification Relays" is intended to indicate contacts of the identification relays (such as relay 0011) of FIG. 8 whereby this identity 0011 may be transferred by any suitable coding over cable ID into FIG. 4 and thence through the preference, lock-out and connector circuit into identity registers in the register-outpulser for use by the register-outpulser.

Figure 4:
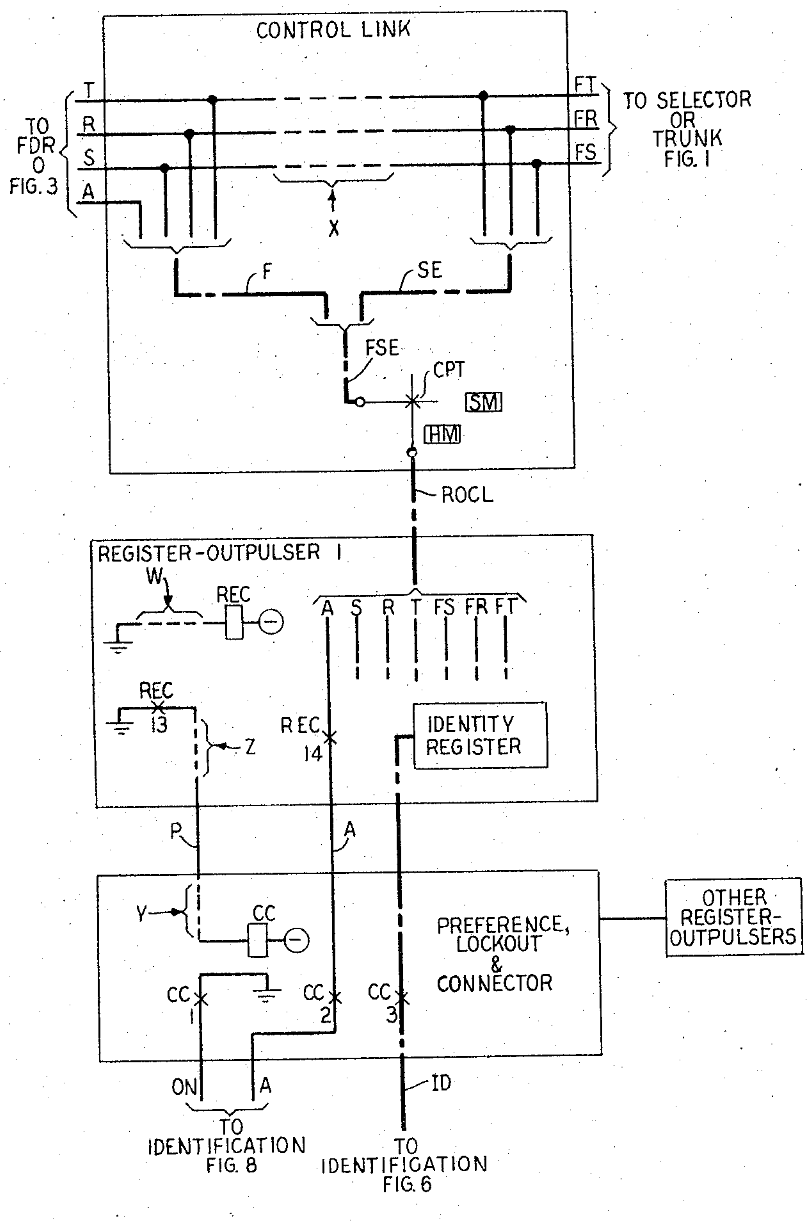
FIG. 4 shows some details of the Control Link, Register-Outpulser, and Preference Lockout and Connector circuitry of FIG. 1.

In FIG. 4 of the drawing only a few circuit details are shown of the control link, the register-outpulser, and the preference, lock-out and connector circuits of FIG. 1 such as will be necessary for an understanding of the use of the present invention.

DETAILED DESCRIPTION

The detailed description of the exemplary embodiment is arranged under six major headings as follows: Circuit Conventions—Line Finder Grouping—Dial Tone Connection—Identifying Calling Line—Release of Common Control—Preferred Finder Bank Multiple.

Circuit conventions

The detailed circuit layout utilizes the detached contact type of schematic drawing where the contacts controlled by a relay winding are not necessarily physically associated closely with the winding shown on the drawing. For instance, in the finder circuit of FIG. 3 relay D is illustrated in the center part of the figure as consisting of two windings and the various make and break contacts of the D relay are illustrated in various parts of FIG. 3 associated with the circuits which they control. For instance, in the bottom central part of FIG. 3 break contact 1 of the D relay is illustrated as interposed between negative battery and the right-hand terminal of the winding of the vertical stepping magnet VERT. The small dash line perpendicular to the battery lead and designated D with a number 1 illustrates a break contact, which is closed when the associated relay is released and which is open when the associated relay is operated. In series with the right-hand terminal of the lower winding of relay D is shown make contact 13 of relay D, illustrated as an X across the conductor in question, this symbol illustrating the usual make contact which is open when the relay is released and closed when the relay is operated. Just to the left of the left-hand terminal of the winding of relay A is shown a pair of contacts numbered 11 of the D relay. One of these contacts is a make contact and the other is a break contact illustrating a well-known transfer contact arrangement. In each instance, contacts controlled by a relay winding appear only on the same sheet of drawing with that winding.

The voltage references used throughout the system are at ground potential and negative battery. Negative battery is symbolized by a minus sign inside a circle, it being understood that the positive terminal of this battery (usually 48 volt direct current) is grounded. In some instances ground or battery potential may be referred to as a signal.

In some instances a dashed line may indicate either a repetitive circuit pattern or the existence of circuitry which is not shown because it is not of particular significance to the disclosure being described. For instance, in the group start circuit of FIG. 5 a dashed line is shown interconnecting conductors G2 and G9 in the upper portion of FIG. 5, this symbol indicating the existence of six other conductors G3 through G8 with associated relays G3 through G8, it not being considered necessary to show all of this repetitive detail. Also, in the lower portion of FIG. 5, dashed lines are shown in series between ground potential and make contacts of the various relays G1 through G0, thereby indicating that other circuitry is actually involved in this series path but is not of any particular concern for the purposes of describing the present invention. With reference to FIG. 4, certain dashed portions of conductors, such as those designated W, X, Y and Z, are labeled because hereinafter some particular remark will be made concerning these circuits which are not shown.

Line finder grouping

Figure 5:
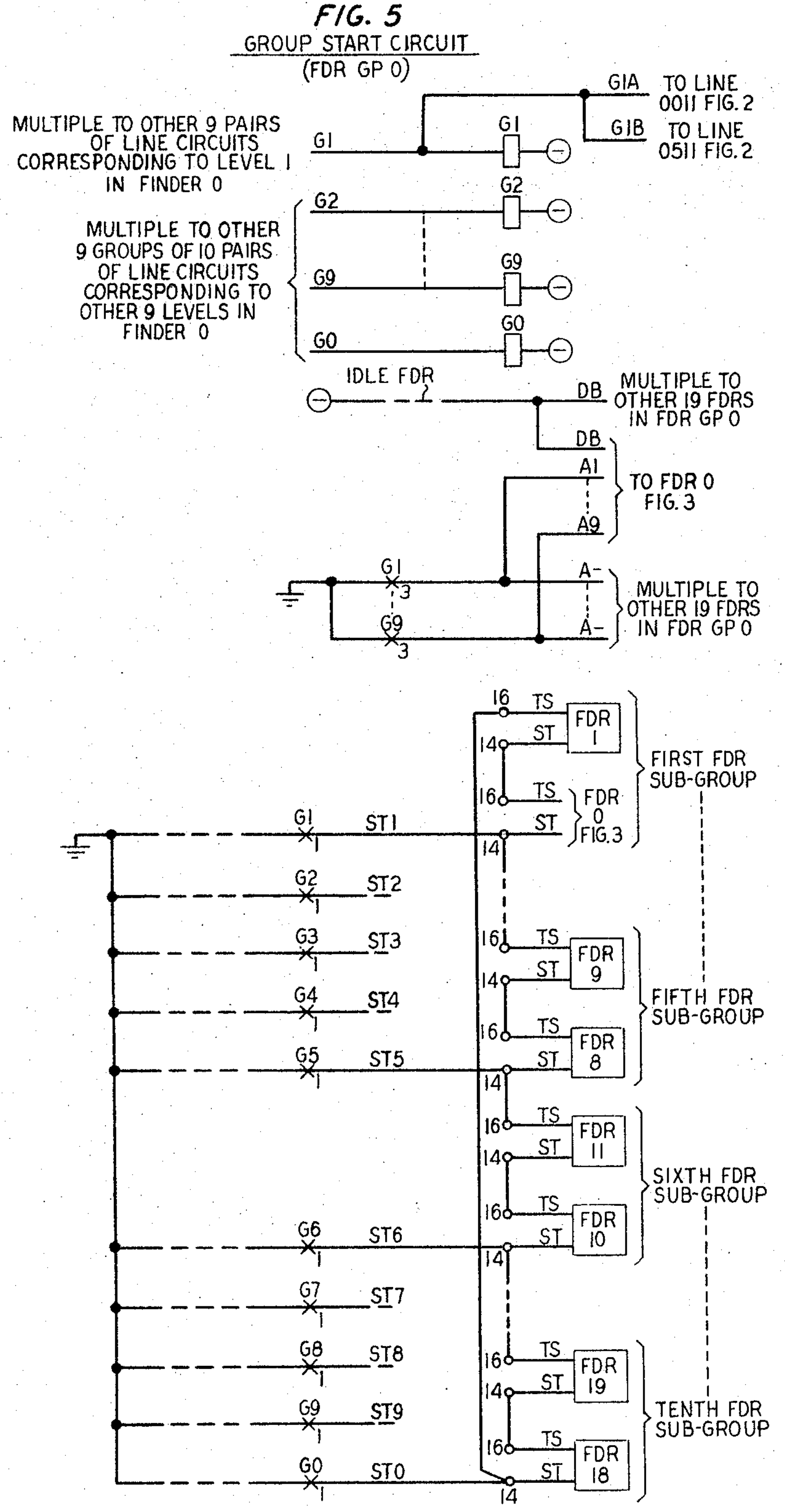
FIG. 5 shows the essence of the usual Group Start circuit associated with line finder operation.

The exemplary disclosure contemplates a step-by-step telephone switching office for handling up to 10,000 calling lines having identifying numbers from 0000 to 9999. The basic line finder chosen as an illustration is a 200-point, four-wire line finder which, as is well known in the art, is capable of terminating in the terminal bank structure thereof two hundred line circuits. Also as is well known, there will be a number of such line finders serving the same group of two hundred lines, such a group usually being termed a line finder group and controlled by a group start circuit (see FIG. 5) uniquely associated with that particular line finder group. In the disclosure line finder group 0, of which line finder 0 of FIG. 3 is one finder, is chosen to be composed of twenty line finders numbered 0 through 19 for serving the two hundred lines appearing on the banks of the finders in this particular finder group. Since each line finder group is capable of terminating two hundred line circuits, five such line finder groups have been chosen for illustration to serve up to 1,000 line circuits. This arrangement of five line finder groups is known as a supergroup (or line group) and, as will be obvious, ten such supergroups will be employed to handle 10,000 lines. FIG. 3 illustrates line finder 0 of finder group 0 in supergroup 0. FIG. 5 illustrates the usual group start circuit for finder group 0 of supergroup 0, it being understood of course that there will be such a group start circuit for each finder group of each supergroup.

As is well known in the art, a 200-point line finder is capable of terminating two line circuits at any particular terminal bank location by virtue of the fact, as shown in FIG. 3, that each terminal location in the terminal bank has upper and lower contacts associated with the upper and lower pairs of four wipers in the brush assembly. The two line circuits 0011 and 0511 have been illustrated as terminating in FIG. 3 at one such line finder terminal bank location. It will be understood of course that the same line finder of FIG. 3 is capable of terminating up to 198 other such line circuits, also arranged in pairs. As will be appreciated from subsequent description, it is necessary for the pair of line circuits terminating at the same terminal bank location in a particular finder to have the same tens and units digits of their four-digit terminal identification number.

In FIG. 7 of the identification circuit, the two sets of ten conductors designated U1 through U0 and T1 through T0 are common to the entire switching office of 10,000 lines. As will be explained in detail hereinafter, part of the identification of any calling line in the system is manifested by the grounding of one conductor in the tens group and one conductor in the units group.

In FIG. 6 of the identification circuit are shown three other groups of conductors common to the office; namely, the five conductors G0 through G4, the two conductors A and B, and the ten conductors LG0 through LG9. The hundreds digit of the calling line identity is manifested by the grounding in FIG. 6 of one of the five conductors G0 through G4 and one of the two conductors A and B; whereas, the thousands digit of the calling line number is identified by virtue of the grounding in FIG. 6 of one of the ten conductors LG0 through LG9.

Dial tone connection

When a call is placed from a line circuit, such as one of the line circuits of FIG. 2, the group start circuit of FIG. 5 will cause one of the finders of finder group 0, such as line finder 0 of FIG. 3, to find the calling line terminal in the terminal bank of the finder. Incident to this line finder operation, the line finder of FIG. 3 will be effective, through the agency of the control link of FIG. 4, to seize an idle register-outpulser for processing the call. The register-outpulser, part of which is illustrated in FIG. 4, will thereupon supply dial tone to the calling line and will prepare itself to receive signals from the calling line, which signals (such as dial pulse signals) may thereafter be utilized by the register-outpulser to control the outgoing switch train. The control link illustrated in FIG. 4 is in essence a switching linkage between the line finder of FIG. 3 and the first selector of a typical outgoing switch train whereby, under the control of crossbar switches, the conductors T, R, S and A from FIG. 3 can be split-off from the first selector and extended into the register-outpulser and whereby the conductors FT, FR and FS extending to the first selector may also be extended into the register-outpulser to permit control over the first selector by the register-outpulser. A typical such control link is described to some extent in the Riddell disclosure and is particularly disclosed and claimed in Patent 3,159,716 to G. Riddell and C. A. Throckmorton of Dec. 1, 1964.

When either of the line circuits 0011 and 0511 of FIG. 2 initiates a call, a circuit will be completed from the station loop thereof to cause the operation of the associated line relay LA or LB under control of break contacts 1 and 2 of the corresponding cutoff relay COA or COB. The operation of the associated line relay LA or LB will in turn complete a circuit from battery, through the winding of the associated cutoff relay COA or COB, thence through make contact 2 of the line relay LA or LB, to the associated sleeve conductor SA or SB extending to the sleeve terminal bank of the line finder or FIG. 3. Also, the operation of the associated line relay will extend ground over its make contact 1, to conductor G1A or conductor G1B extending from FIG. 2 into the group start circuit of FIG. 5, and therein to negative battery through the winding of the group relay G1, which thereupon operates. In passing it will be noted with respect to FIG. 2 that the tip, ring and sleeve conductors of any line circuit, such as conductors TA, RA and SA of line circuit 0011, will appear in multiple in the terminal banks of the other nineteen line finders in finder group 0, preferably with the usual slip-multiple arrangement well known in the art whereby a line may terminate in different levels of different finders in the finder group. In FIG. 5, the operation of group relay G1 is an indication to the group start circuit that this particular calling line appears on level No. 1 of line finder 0 in line finder group 0, thereby providing circuit information for directing line finder 0, if used, to step up to its first level and then to hunt in a rotary horizontal direction through that level to find the calling line. The operation in FIG. 5, of relay G1 extends ground potential through its make contact 3, to conductor A1 extending into finder 0 of FIG. 3 to thereby ground the No. 1 level commutator segment A1 of the vertical stepping circuitry. This will cause the wiper of the commutator to stop on this particular segment and transfer the finder operation to the usual rotary hunting for finding the calling line in that level. Conductor A1 in FIG. 5, as is well known, will be multipled to other conductors A1 to A9 of other finders in finder group 0 according to the levels thereof wherein the same line terminates according to the well-known slip-multiple. This may cause some other finder to move vertically to its particular pertinent level, et cetera. Also in FIG. 5, upon the operation of relay G1, a circuit is completed for selecting a line finder in finder group 0 for serving this call, this circuit extending from ground in FIG. 5, over make contact 1 of relay G1 to the start conductor ST1 extending to terminal 14 of line finder 0 (the preferred finder) of FIG. 3, over conductor ST into FIG. 3, thence over contact 2 of the make-busy switch MB, and to transfer contacts 11 of relay D. Relay D of finder 0 of FIG. 3 will be released if this finder is not in use. If relay D of the finder of FIG. 3 is operated, as an indication that this finder is not available to serve the call, the above circuit will be completed in FIG. 3 over make contact 11 of relay D, thence over contact 4 of the make-busy switch MB, thence over conductor TS into FIG. 5 to terminal 16 of finder 0, thence to terminal 14 of finder 1 (indicated as a box in FIG. 5) and to the start conductor ST extending into finder 1 as a second choice. If finder 1 is also busy, the circuit in FIG. 5 will thereupon extend to the start conductor to finder 18 and so on until one of the finders 0 through 19 of finder group 0 is picked to serve the call.

It will be assumed that line finder 0 of FIG. 3 is available to serve this call, as indicated by the released condition of its relay D. Under these circumstances, ground on start conductor ST in FIG. 3 from the group start circuit of FIG. 5 will extend as above mentioned over contact 2 of the make-busy switch MB, thence over break contact 11 of relay D, to negative battery, through the winding of the slow-release relay A, thereby causing relay A to operate.

The operation of the A relay of FIG. 3 extends ground over its make contact 7 in FIG. 3 to the sleeve conductor S extending into the control link of FIG. 4, thereby to cause circuit operations to take place whereby the control link will seize an idle register-outpulser for processing the call. As a result of this register-outpulser seizure circuit operation in FIG. 4, the conductors T, R, S and A extending into FIG. 4 from the finder of FIG. 3 are further extended into the register-outpulser 1, and the three conductors FT, FR and FS extending to the first selector of the outgoing switch train are also extended into the register-outpulser. The connection designated X in the control link of FIG. 4 is opened at this point, but the tip and ring loop (conductors T and R to conductors FT and FR) is completed through circuitry which is not shown in the register-outpulser. The completion of this tip-ring loop to the first selector of the outgoing switch train will, as is well known in the art, cause the seizure of a first selector awaiting dial pulse digits for its control.

In the finder circuit of FIG. 3, upon the operation of relay A, a circuit is completed for causing the operation of relay C, this circuit extending from ground in FIG. 3, over make contact 5 of relay A, break contact 1 of the vertical stepping magnet VERT, break contact 2 of the rotary stepping magnet ROT, through the lower secondary winding of relay C, to negative battery over break contact 1 of relay D. Upon the operation of relay C, a circuit is completed for operating the vertical stepping magnet VERT, this circuit extending from ground in FIG. 3, over make contact 5 of relay A, make contact 2 of relay C, break contact 6 of relay E, through the winding of the VERT magnet, to negative battery over break contact 1 of relay D. Each operation of the vertical stepping magnet VERT causes the commutator brush and the communication circuit brushes to make a vertical step in the terminal bank structure. Upon the operation of magnet VERT, the above-described operating circuit for relay C is opened at break contact 1 of magnet VERT, thereby causing relay C to release, the release of which in turn causes the release of the vertical stepping magnet VERT. Upon the release of the vertical stepping magnet VERT, relay C is reoperated, to in turn cause the reoperation of the magnet VERT. This process continues until such time as the commutator brush contacts a vertical commutator segment which is grounded from the group start circuit of FIG. 5. It is has been assumed that the group start circuit of FIG. 5 has grounded conductor A1 into finder 0 of FIG. 3, thereby causing the first commutator segment No. 1 to be grounded. Thus, upon the first operation of the vertical stepping magnet VERT, commensurate with which the commutator brush contacts the No. 1 commutator segment, a circuit is completed for energizing the lower primary winding of relay E in series with the lower secondary winding of relay C. This circuit extends from ground on conductor A1 in FIG. 3, over vertical commutator segment No. 1, to the vertical commutator brush, through the lower primary winding of relay E, break contact 2 of the rotary stepping magnet ROT, thence through the lower secondary winding of relay C, to negative battery over break contact 1 of relay D. Relay C is held operated by the current flowing in this circuit, thereby to prevent any further vertical stepping of the brush assembly. Relay E is a slow-operate relay and will not operate until a prescribed interval of time has passed after the energization of its lower primary winding. This allows sufficient time from the last vertical step and before rotary stepping is begun to prevent snagging of the wiper assemblies due to vibration. Eventually, relay E will become operated, whereupon it completes a locking circuit for itself through its upper secondary winding in series with the vertical stepping magnet VERT, this circuit extending from negative battery in FIG. 3, over break contact 1 of relay D, thence through the winding of the vertical stepping magnet VERT, through the upper secondary winding of relay E, over make contact 4 of relay E, and thence to ground over make contact 5 of relay A. The amount of current flowing in this latter circuit is sufficient to hold operated relay E but is insufficient to maintain the vertical stepping magnet VERT operated, the latter magnet thereupon releasing.

Upon the operation of relay E in FIG. 3 and the release of the vertical stepping magnet VERT, with relay C maintained operated as above described, a circuit is completed for causing the first operation of the rotary magnet ROT. This circuit extends from ground in FIG. 3, over make contact 5 of relay A, make contact 2 of relay C, make contact 6 of relay E, to negative battery through the winding of the rotary magnet ROT. Each operation of the rotary magnet ROT causes the communication wiper brush assembly to take one step in the horizontal or rotary direction in the first level of the finder to test for the presence of a calling line. Upon each operation of the rotary magnet ROT, its break contact 2 opens to deenergize the lower secondary winding of relay C, which thereupon releases to in turn cause the release of the rotary magnet ROT. As soon as the rotary magnet ROT releases, relay C is reoperated, to in turn cause the reoperation of the rotary magnet ROT. This process continues to cause the brush assembly to step across the prescribed horizontal level in the terminal bank structure until a calling line is found.

The rotary stepping of the line finder brush assembly will stop as soon as one of the sleeve conductors SA and SB extending into FIG. 3 from a line circuit of FIG. 2 is detected as having a potential thereon of negative battery through the winding of the line cutoff relay. The finder operates in a slightly different fashion depending upon whether the calling line is detected as being line circuit 0511 or line circuit 0011. If the cutoff relay battery condition is detected on sleeve conductor SB in FIG. 3, thereby indicating that line circuit 0511 of FIG. 2 is the calling line, the significant finder function will be the operation therein of relay B; whereas, if the calling line is detected by virtue of cutoff relay battery being detected on conductor SA in FIG. 3, relay B of the finder will be operated as in the other case, but in this particular instance relay F will be operated also.

If the calling line circuit happens to be line circuit 0511 of FIG. 2, then as soon as the finder wipers strike the terminal bank location wherein line circuit 0511 terminates, a circuit will be completed for causing the energization of the left primary winding of relay B. This circuit extends from negative battery in FIG. 2, through the winding of cutoff relay COB, over make contact 2 of relay LB, sleeve conductor SB extending into FIG. 3, thence across the brush wiper to conductor SB of the line finder, thence through the left-hand primary winding of relay B, over break contact 6 of relay D, thence through the upper primary winding of relay C, to ground over make contact 7 of relay A. As is well known in the art, the energization of this left-hand primary winding of relay B will cause relay B to partially operate so as to close its make contact 2 connected to its right-hand secondary winding. Upon this partial operation, a circuit is completed through the right-hand secondary winding of relay B extending from negative battery, through the right-hand secondary winding of relay B, over make contact 2 of relay B, over make contact 4 of the rotary magnet ROT (maintained operated because relay C was not allowed to release), thence over make contact 2 of relay C and to ground over make contact 5 of relay A. Upon this energization of the right-hand secondary winding of relay B, this relay becomes fully operated, thereby to control all of its other make and break contacts in the finder circuit. In the meantime, relay C is maintained operated by virtue of the fact that its upper primary winding is in a series circuit with the left-hand primary winding of the B relay back to the cutoff battery on sleeve conductor SB. Upon the operation of relay B, the tip and ring leads TB and RB from line circuit 0511 in FIG. 2 are extended over the next-to-bottom pair of wipers in the finder of FIG. 3, thence over break contacts 4 and 7 of relay F, make contacts 10 and 11 of relay B, to the tip and ring leads T and R extending into the control link of FIG. 4.

Upon the full operation of relay B in the finder of FIG. 3, a circuit is completed for causing the operation of relay D extending from ground in the upper center part of FIG. 3, over contact 3 of the vertical off-normal switch VON (operated as soon as the finder began stepping in a vertical direction), thence over make contact 7 of relay B, to negative battery through the upper winding of relay D, which thereupon operates. The operation of relay D interconnects the sleeve conductor S extending to the control link of FIG. 4 with the sleeve conductor SB extending back toward the calling line circuit of FIG. 2, this circuit extending from conductor S in FIG. 3, over make contact 6 of relay D, break contact 8 of relay F, and make contact 4 of relay B to sleeve conductor SB. The operation of relay D also connects sleeve ground under control of make contact 2 of relay B to the right-hand secondary winding of relay B to maintain this relay B operated. The ground on the sleeve conductor S from the control link is supplied thereto either from the register-outpulser or from the first selector of the outgoing switch train, as is well known in the art. The operation of relay D also causes the advance of the line finder starting conductors of the group start circuit in FIG. 5, whereby any subsequent starting ground appearing on conductor ST in FIG. 3 from FIG. 5 will be extended over contact 2 of the make-busy switch MB, thence over make contact 11 of relay D, contact 4 of the make-busy switch MB, to conductor TS extending back into FIG. 5 to advance the start condition to the next preferred finder in the group. In the meantime, the start ground still existing on conductor ST from FIG. 5 will be extended in FIG. 3 over make contact 13 of relay D through the lower secondary winding of relay D, conductor DB extending into FIG. 5, and thence through a circuit (not shown, which indicates the availability of an idle finder) to negative battery, relay D being held operated in this additional circuit through its lower secondary winding.

Upon the operation of relay D of the finder of FIG. 3, relay C is released by a short-circuiting of its upper primary winding, and the winding of the slow-release relay A is de-energized, thereby allowing relay A to release after an interval of time determined by its slow-release characteristic. The upper primary winding of relay C is shunted in an obvious fashion by make contact 6 of relay D. Relay D, in operating, causes the release of relay E, which in turn causes the release of the rotary stepping magnet ROT. Eventually, relay A will release after an interval of time determined by its slow-release characteristic, thereby providing an additional locking circuit for relay D extending from the left-hand side of the upper primary winding of relay D, over break contact 2 of relay A, to ground over contact 3 of the vertical off-normal switch VON, thereby holding operated relay D.

In the meantime, upon the operation of relay D in FIG. 3, which, as above described, extends sleeve ground from the control link of FIG. 4 to the sleeve conductor SB of the finder, a circuit is completed over this wiper to the sleeve conductor SB of line circuit 0511, thence into FIG. 2, over make contact 2 of relay LB, to negative battery through the winding of the cutoff relay COB, which thereupon operates. The operation of the cutoff relay COB causes the release in FIG. 2 of the line relay LB (relay COB locking operated to the sleeve lead SB in known fashion), the release of which in turn removes operating ground from the winding of the group relay G1 of FIG. 5 insofar as this line circuit is concerned.

If the calling condition is found by the line finder of FIG. 3 to exist on sleeve conductor SA of line circuit 0011 in FIG. 2 instead of on sleeve conductor SB of line circuit 0511 of FIG. 2, a circuit is completed for causing the operation in FIG. 3 of relay F. This circuit extends from negative battery in FIG. 2, through the winding of relay COA, over make contact 2 of relay LA, conductor SA into FIG. 3, over the terminal brush assembly to conductor SA of the finder circuit, thence through the left primary winding of relay F, break contact 4 of relay B, break contact 8 of relay F, through the upper primary winding of relay C, to ground over make contact 7 of relay A. Similar to the operation previously described of relay B, the energization of the left-hand primary winding of relay F in series with the upper primary winding of relay C holds relay C operated and causes relay F to partially operate sufficiently to close its make contact 1. When make contact 1 of relay F closes, a circuit is completed to energize the right-hand secondary winding of relay F extending from negative battery, through the right-hand secondary winding of relay F, make contact 1 of relay F, make contact 10 of relay E, make contact 4 of the rotary magnet ROT, make contact 2 of relay C, to ground over make contact 5 of relay A. The energization of the right-hand secondary winding of relay F causes relay F to fully operate, thereby to control the others of its contacts in the finder circuit of FIG. 3. Upon the complete operation of relay F, a circuit is completed for causing the operation of relay B extending from negative battery, through the right-hand secondary winding of relay B, over make contact 5 of relay F, to the previously-described operating ground for relay F. Relay B, in operating, locks over its own make contact 2, as previously described. The rest of the circuit operation is the same as above described, whereunder relay B only was operated. The only difference in the present circumstance is that with relay F operated, the tip and ring conductors TA and RA from line circuit 0011 of FIG. 2 into the line finder of FIG. 3 are extended over make contacts 4 and 7 of relay F, and make contacts 10 and 11 of relay B to the tip and ring conductors T and R extending into the link control circuit of FIG. 4.

If the line circuit 0511 of FIG. 2 had been the calling line, then the following circuit conditions would prevail at this point: in the finder of FIG. 3, relays B and D will be operated; in the line circuit of FIG. 2, relay COB will be operated (and locked to the sleeve lead SB), and relay LB will be released; the tip and ring conductors TB and RB from line circuit 0511 in FIG. 2 will extend into FIG. 3, thence over the next-to-bottom pair of wipers of the finder, thence over break contacts 4 and 7 of relay F, make contacts 10 and 11 of relay B, to the tip and ring conductors T and R extending into the control link of FIG. 4; the sleeve conductor SB of line circuit 0511 in FIG. 2 will extend into FIG. 3, thence over the lowermost of the upper pair of wipers of the finder, conductor SB, make contact 4 of relay B, break contact 8 of relay F, make contact 6 of relay D, to the sleeve conductor S extending into the control link of FIG. 4 and eventually to ground potential either in the register-outpulser or in the first selector circuit of the outgoing switch train; the group start circuitry of FIG. 5 will no longer be controlled by the released line relay LB of FIG. 2; and, the A lead extending from the control link of FIG. 4 into the finder of FIG. 3 will extend over make contact 14 of relay B, and thence through diodes DAB and DAA to conductors AB and AA and onto the terminal identification bank contacts to conductors AB and AA extending to the respective line circuits 0511 and 0011 of FIG. 2; and, the A lead from the control link of FIG. 4 also extends into the finder of FIG. 3, over make contact 14 of relay B, break contact 2 of relay F, through diode DB0 to conductor B0 extending into the identification circuit of FIG. 6.

If, on the other hand, line circuit 0011 of FIG. 2 had been the calling line, then the following circuit conditions would have prevailed: in the finder of FIG. 3, relays B, D and F will be operated; in the line circuit of FIG. 2, relay COA will be operated (and locked to the sleeve lead SA), and relay LA will be released; the tip and ring conductors TA and RA from the line circuit 0011 of FIG. 2 will extend into the finder circuit of FIG. 3, thence over make contacts 4 and 7 of relay F to the previously-described circuit to the tip and ring conductors T and R extending to the control link of FIG. 4; likewise, the sleeve conductor SA of line circuit 0011 in FIG. 2 will extend into the finder circuit of FIG. 3, thence over make contact 8 of relay F, make contact 6 of relay D, to the sleeve conductor S extending to the control link of FIG. 4; the group start circuit of FIG. 5 will no longer be controlled by the released line relay LA of FIG. 2; and, the A lead from the control link of FIG. 4 will extend into FIG. 3, over make contact 14 of relay B to the previously-described conductors AB and AA to the line circuits of FIG. 2, and in FIG. 3 over make contact 2 of relay F through diode DA0 to conductor A0 extending into the identification circuit of FIG. 6.

Ground on the sleeve conductor S extending to the finder of FIG. 3 from the control link of FIG. 4, as previously mentioned, will be supplied from either the register-outpulser or from the first selector in the outgoing switch train. This ground on the sleeve conductor S in the finder of FIG. 3 holds operated relay B and holds operated the cutoff relay COA or COB in the line circuit of FIG. 2. Ground over contact 3 of the vertical off-normal switch VON in the finder of FIG. 3 holds operated relay D of FIG. 3 and relay F (if the latter relay is operated).

Eventually, as will be mentioned again hereinafter, when ground is removed from the sleeve conductor S extending between the finder of FIG. 3 and the control link of FIG. 4, indicating that the circuits beyond have gone to a released condition, the cutoff relay COA or COB of the line circuit of FIG. 2 will release, as will relay B of the finder circuit of FIG. 3. Upon the release in FIG. 3 of relay B, a circuit will be completed for operating the release relay RLS of the finder, this circuit extending from negative battery in FIG. 3, through the winding of relay RLS, over contact 1 of the vertical off-normal switch VON, over break contact 2 of relay E, break contact 7 of relay B, break contact 2 of relay A, to ground over contact 3 of the vertical off-normal switch VON. Upon the operation of this release relay RLS, the finder circuitry of FIG. 3 will return itself completely to normal, including the eventual release of the vertical off-normal switch VON, the release of which will in turn cause the release of relay D in FIG. 3 and of relay F in FIG. 3 (if the latter relay had been operated previously).

Eventually, as is described in detail in the Riddell disclosure, relay REC is operated in the register-outpulser of FIG. 4 after a number of internal circuit operations represented by the dashed line designated W in FIG. 4. The operation of relay REC in the register-outpulser is indicative of the fact that the register-outpulser is prepared to process the call. As a result of the operation of this relay REC, the tip and ring conductors T and R are split-off in the register-outpulser from the fundamental tip and ring circuit comprising conductors FT and FR extending toward the outgoing switch train. The tip and ring conductors T and R are terminated in the register-outpulser in a line relay (not shown) so that the register-outpulser may detect and count dial pulsing from the calling line. The fundamental tip and ring leads FT and FR extending toward the outgoing switch train are controlled by circuitry in the register-outpulser whereby it may transmit dial pulse digital information to the outgoing switch train. Furthermore, the operation of relay REC in the register-outpulser of FIG. 4, as an incident to terminating the calling line tip and ring leads and in splitting the connection between the line finder and the first selector, causes dial tone to be transmitted back over the tip and ring leads T and R toward the finder of FIG. 3 and thence to the calling line circuit of FIG. 2 as an indication to the calling subscriber that he may proceed to dial the necessary digital information upon which the register-outpulser can base its further switching operations.

Identifying calling line

As an incident to the operation of relay REC in the register-outpulser of FIG. 4, as previously mentioned, the register-outpulser will initiate a bid in the preference, lockout and connector circuitry for the services of the identification circiut of FIGS. 6, 7 and 8. The preference, lockout and connector circuit of FIG. 4 has been shown in a very simple manner because such circuits are well known to those skilled in the art, whereby a number of circuits such as register-outpulsers may compete for the services of a single piece of common equipment. In the register-outpulser of FIG. 4, the dotted line designated Z indicates the presence of any suitable known circuitry which provides a closed circuit at the time that the register-outpulser places its bid for the services of the identification circuit and which can be opened at any subsequent convenient time to allow the register-outpulser to release from its connection to the identification circuitry. Likewise, in the preference, lockout and connector circuit, the dashed portion of the circuitry designated Y is to indicate the presence of the usual circuitry by means of which various register-outpulsers will compete for the services of the identification circuit, it being well known in the art that one and only one of these circuits at a time will effect the operation of its associated connector relay, such as relay CC, to complete an actual connection. When these two circuits Z and Y in FIG. 4 are rendered effective, a circuit will be completed for causing the operation of the connector relay CC in the preference, lockout and connector circuit for interconnecting register-outpulser 1 with the identification circuitry of FIGS. 6, 7 and 8. This circuit extends from ground in FIG. 4, over make contact 13 of relay REC, through the circuitry Z, conductor P, into the preference, lockout and connector circuit, through circuit Y, and thence to negative battery through the winding of connector CC. Connector CC, in operating, extends ground from FIG. 4 over its own make contact 1 and over conductor ON into FIG. 8 to cause the operation of the off-normal relay ON in the identification circuit. Make contact 1 of the operated ON relay in FIG. 8 supplies ground potential to the locking circuits in FIG. 8 of all of the basic registration relays LG0 through LG9, AI and BI, G0I through G4I, U1 through U0 and T1 through T0. Ground is also supplied over make contact 2 in FIG. 8 of relay ON to conductor A, extending back into FIG. 4, thence over make contact 2 of connecter relay CC, conductor A into the register-outpulser, thence over make contact 14 of relay REC, conductor A, cable ROCL into the control link of FIG. 4, thence over the closed crosspoint CPT of a crossbar switch (diagrammatically shown as including hold and select magnets HM and SM), thence over cables FSE and F, conductor A into the finder of FIG. 3, thence over make contact 14 of relay B to transfer contacts 2 of relay F and to the lower electrodes of diodes DAA and DAB. This ground potential will extend through diodes DAA and DAB (poled as indicated to represent low impedance) to conductors AA and AB, thence to and over the bottom pair of wipers and terminal contacts to conductors AA and AB into the respective line circuits 0011 and 0511 in FIG. 2. Such diodes DAA and DAB (as well as DA0 and DB0 of FIG. 3 and the various diodes of FIG. 6) are well known asymmetric impedance devices which exhibit a substantial and effective difference in impedance to flow in opposite directions therethrough of signals. Thus, any ground signal appearing on these wipers cannot effectively pass through the diodes DAA and DAB in the reverse direction. In FIG. 2 conductor AA from FIG. 3 is connected to a punching A associated with line circuit 0011 and punching A is connected to conductor AA1 extending into FIG. 7; and, conductor AB extending into FIG. 2 from FIG. 3 is connected to a punching B which in turn is connected to conductor AB1, also extending into the identification circuit of FIG. 7. In FIG. 7, these two conductors AA1 and AB1 extending from the line circuits of FIG. 2 will apply ground potential to respective conductors T1 and U1, thereby designating both of these line circuits as involving the same tens and units digits 11 in their four-digit identification number. The grounded conductors T1 and U1 in FIG. 7 extend over respective cables T and U into FIG. 8, thence over conductors T1 and U1 to battery through the windings of respective relays T1 and U1. These two relays operate and lock to off-normal ground over their own make contacts 1.

In the meantime, ground on conductor A in the finder circuit of FIG. 3 and appearing at transfer contacts 2 of relay F as above described, will be applied over make contact 2 of relay F or over break contact 2 of relay F to the right-hand electrode of either diode DA0 or DB0, and thence to either one of the conductors A0 and B0 extending into the identification circuit of FIG. 6. It will be recalled that relay F in the finder of FIG. 3 will be operated if line circuit 0011 of FIG. 2 is the calling line but will be released if line circuit 0511 of FIG. 2 is the calling line. Whichever one of these situations prevails, ground will extend over conductor A0 or B0 from FIG. 3 into FIG. 6, wherein ground on conductor A0 will extend through diode DA2 to ground conductor A and will extend through diodes DA1, DG1 and DG2 to ground conductor G0 and through diode DG3 to ground conductor LG0. This set of circumstances associated with line circuit 0011 of FIG. 2 will therefore result in the grounding in FIG. 6 of conductors A, G0 and LG0. On the other hand, if conductor B0 from FIG. 3 into FIG. 6 is grounded (with respect to line circuit 0511 of FIG. 2), this ground will extend in FIG. 6 from conductor B0 through diode DB2 to ground conductor B and through diodes DB1, DG1, DG2 and DG3 to ground conductors G0 and LG0. Therefore, if line 0511 of FIG. 2 is the calling line, the conductors which will be grounded in FIG. 6 will be conductors B, G0 and LG0. These three grounded conductors will extend over cable G, AB and LG from FIG. 6 into FIG. 8 where the corresponding relays G0I, LG0 and either AI or BI will be operated and locked. The operation of these register relays LG0, G0I, U1, T1 and either AI or BI in the left-hand portion of FIG. 8 will result in the operation in the lower right-hand corner of FIG. 8 of one or the other of the identification relays 0011 and 0511 so as to completely identify the four digits of the line terminal in the finder bank.

Assuming that line circuit 0011 of FIG. 2 is the calling line (relay F of FIG. 3 operated and relay AI of FIG. 8 operated with relay BI of FIG. 8 released), circuits are completed in FIG. 8 for causing the operation in the lower right-hand corner of identification relay 0011. With relays LG0, AI and G0I operated, a circuit is completed in the upper right-hand portion of FIG. 8 for causing the operation of relay 00, this circuit extending from ground, over make contacts 2 of relays LG0 and AI, thence over make contact 5 of relay G0I to operate relay 00. Upon the operation of relay 00 in FIG. 8, with relays U1 and T1 operated, a circuit is completed for causing the operation of identification relay 0011, this circuit extending from ground in FIG. 8, over make contact 1 of relay 00, make contact 2 of relay U1, and make contact 7 of relay T1 to battery through the winding of relay 0011, which thereupon operates. By a similar set of circumstances, if the line circuit 0511 of FIG. 2 had been the calling line, then circuits will have been completed in FIG. 8 under control of the operated relays LG0, BI, G0I, U1 and T1 to cause the operation in the upper right-hand part of FIG. 8 of relay 05 and the operation in the lower right-hand portion of FIG. 8 of relay 0511.

Upon the operation in FIG. 8 of one or the other of the two identification relays 0011 and 0511, circuits may be completed over contacts (not shown) of these relays, as indicated by the contact network identification box in the lower left-hand corner of FIG. 6, to transfer this identity information by any suitable coding over cable ID extending from FIG. 6 into FIG. 4, thence over make contacts of the connector relay CC, and into identity registers in the register-outpulser. By this means a calling line terminal identity will be registered in suitable registers of the register-outpulser and this registration will be locked in the register-outpulser locally, thereby having completed the identification process insofar as the register-outpulser is concerned.

Release of common control

Upon the registration in the register-outpulser of FIG. 4 of the calling line terminal identity, suitable circuitry (not shown) well known in the art will come into play for checking that this registration has properly been made and will thereupon open the circuitry marked Z, to in turn cause the release of the connector CC in the preference, lock-out and connector circuitry. Upon the release of connector CC, the off-normal relay ON in the identification circuit of FIG. 8 will be released, thereby causing the release of all of the operated relays of FIG. 8 to return the identification circuit to normal so that it may be used by another register-outpulser for another identification job. The release in FIG. 8 of the identification circuit off-normal relay ON removes ground from conductor A extending from FIG. 8 into FIG. 4, where the release of connector CC also removes this ground potential from conductor A extending back through the register-out-pulser and the control link into the finder circuitry of FIG. 3. With the removal of ground from the A conductor in the finder of FIG. 3, this identification signal will no longer appear on the wipers and terminal bank multiples of the line finder grouping, so that there can be no confusion with possibly a subsequent identification signal that may be applied within the same finder bank multiple from another finder on another identification job.

Eventually, the register-outpulser will have received all of the dialed digital information from the calling line circuit of FIG. 2 and will have completed whatever outpulsing or controlling functions are required as a result thereof in setting up the outgoing switch train. When this situation prevails, the register-outpulser of FIG. 4 will release itself from connection with the control link, to in turn complete the circuits X in the control link to establish a through-transmission condition of the tip, ring and sleeve conductors between the line finder of FIG. 3 and the first selector in the outgoing switch train.

As is well known in the art, when the established connection has served its purpose and the calling and called stations or parties have disconnected, the entire switching connection will release itself, including the return of the finder of FIG. 3 to its normal unoperated condition.

Preferred finder bank multiple

In the previous description it was pointed out that the two line circuits of FIG. 2 were assigned the same tens and units digits 11 since they both terminated at the same line finder terminal bank location. These tens and units digits could be any combination desired, it being understood that all other multiple appearances of these two line circuits in the usual line finder slip multiple arrangement must have the conductors AA and AB from those finder bank terminal locations, such as in FIG. 3, connected to the same two conductors AA1 and AB1 extending from punchings A and B of FIG. 2 into the identification circuitry of FIG. 7. In other words, the two identification leads associated with the two line circuits appearing at the same line finder terminal bank location throughout the line finder multiple, no matter how these multiple appearances may be arranged, must always be connected to the same tens and units conductors in the identification circuit of FIG. 7.

Figure 9:
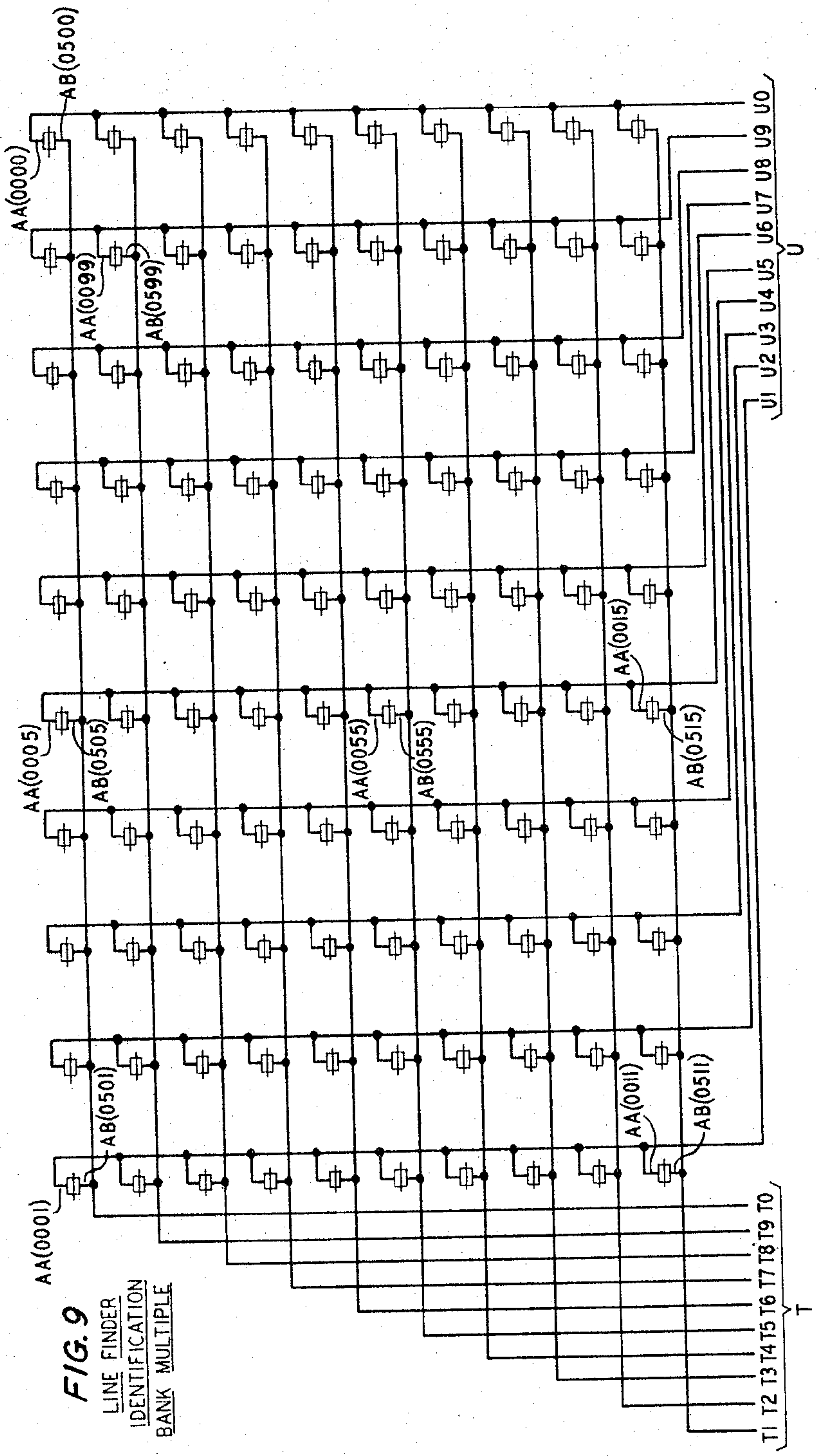

FIG. 9 illustrates a preferred assignment of line circuit locations in the terminal bank of one finder (such as finder 0) of the line finder group (such as finder group 0) serving the two hundred lines 0000 to 0099 and 0500 to 0599. It will be noted in FIG. 9 that line circuit 0011 of FIG. 2 and line circuit 0511 of FIG. 2 have been assigned as the pair of line circuits which will appear in the first horizontal level of the finder identification bank and in the first vertical row of the finder identification bank. This means that the finder must make one vertical step to arrive at the proper horizontal row and one rotary step to arrive at the proper vertical row in order to find either one of these two calling lines. The rest of the structure of this preferred terminal bank will be obvious by inspection to result in the assignment of line circuits in accordance with the coordinate location in this bank, as identified by the tens and units digits of their four-digit identification number. The bottom identification bank contacts in the first horizontal level are all multipled and connected to conductor T1, thereby indicating that any one of the line circuits identified by this lower first level identification bank contact will have the same tens digit of 1. Likewise, all of the upper identification bank contacts in the first vertical row are multipled and connected to a conductor U1, thereby indicating that any line circuit having its identification bank contact appearing as an upper contact in this first row must have the same units digit of 1. This process is repeated throughout the one hundred coordinate locations in this finder bank. The hundreds digit of 5 or 0 is resolved through the agency in the finder circuit of FIG. 3 of causing the energization of either conductor A0 or B0 extending into FIG. 6, to thereby cause the operation of either the AI or the BI relay in FIG. 8. The operation of the AI or BI relay will resolve the situation into one or the other of the hundreds digit 0 or 5, as has been seen from the above description.

While FIG. 9 shows the preferred way of establishing a pattern of connections to the ten tens leads and to the ten units leads, it will be understood that all other appearances of the same line circuit throughout the usual slip-multiple in the other nineteen finders of this finder group will necessarily have their identification contact connected to the same tens and units leads. In the presence of the usual slip-multiple, it is of course impossible to utilize the simple vertical and horizontal multipling in the other finders of this group, as has been used in this preferred arrangement with one finder. However, using the preferred multipling arrangement of FIG. 9 on one finder of each finder group simplifies the task of wiring this particular finder. In this preferred arrangement it will, of course, be understood for instance that the conductor marked AA in FIG. 9, which is merely a short lead connecting the upper identification contact to the vertical multiple to units lead U1, replaces the conductor AA extending from the bank contact of FIG. 3 over to the line circuit 0011 of FIG. 2. It will also be understood that the ten tens leads and the ten units leads shown in FIG. 9 would then be directly connected to the correspondingly numbered leads in FIG. 7 of the identification circuit. Also, the remaining leads extending into FIG. 7 would be only those coming from the other multiple locations of the same line circuit identification bank contacts in other finders of the same finder group.

It is to be understood that the above-described arrangements are illustrative of the application of the principles of the invention. Numerous other arrangements may be devised by those skilled in the art without departing from the spirit and the scope of the invention.

What is claimed is:

1. A calling line terminal identifier comprising:
(A) a line finder comprising
  (1) a terminal bank having
    (a) a plurality of calling line terminal locations
    (b) and at least one pair of bank contacts at each location
    (c) and a different identity number assigned to each location,
  (2) a wiper assembly having at least one pair of wipers adapted to make contact with said one contact pair at one bank location at one time,
  (3) and finder circuitry controllable to cause said wiper assembly to find a calling line terminating in said bank by causing said wiper assembly to make contact with the finder terminal location of said calling line;
(B) a source of signal;
(C) means for applying said signal to said one wiper pair while said wiper assembly is in contact with the finder terminal of said calling line;
(D) a group of conductors of which at least two selected conductors are connected to each selected contact pair according to the number assigned to the terminal location of said selected contact pair;
(E) and, means for ascertaining to which of said conductors said signal is applied, thereby to ascertain the number of said calling line terminal location.

2. The invention defined in claim 1:
(A) wherein said identity number is a two-digit number;
(B) wherein said group of conductors comprises
  (1) a first set of conductors of which at least one selected conductor is connected to a first contact of each selected contact pair according to a first digit;
  (2) and a second set of conductors of which at least one selected conductor is connected to the second contact of each selected contact pair according to the second digit;
(C) and, wherein said ascertaining means ascertains the two-digit number of said calling line terminal location by ascertaining to which conductors of said sets thereof said signal is applied.

3. The invention defined in claim 2:
(A) wherein a plurality of said line finders is provided as a line finder group to serve the same calling lines;
(B) wherein each line terminates in multiple to a bank location in each finder of the group;
(C) and, wherein said signal applying means includes transmission control means in said finder to allow effective transmission of said signal in the direction from the source thereof to said one pair of wipers and to prevent effective transmission of said signal in the reverse direction.

4. The invention defined in claim 3 wherein said transmission control means comprises impedance in series with said one pair of wipers, said impedance exhibiting a substantial and effective difference in impedance to flow in opposite directions therethrough of signals.

5. The invention defined in claim 4 wherein said impedance comprises a properly poled diode in series with each of said one pair of wipers.

6. The invention defined in claim 2:
(A) wherein said finder terminal bank has one hundred terminal locations to each of which is assigned a different number from 00 to 99;
(B) wherein said first set of conductors comprises ten tens conductors, each connected to a said first contact of each contact pair having the same corresponding tens digit;
(C) wherein said second set of conductors comprises ten units conductors, each connected to the second contact of each contact pair having the same corresponding units digit;
(D) and, wherein said ascertaining means ascertains which tens and units conductors have said signal applied thereto.

7. The invention defined in claim 6:
(A) wherein said one hundred terminal locations are arranged in ten horizontal levels 1 through 0 (ten) and in ten vertical rows 1 through 0 (ten);
(B) wherein the tens digit assigned to any location is the number of its level location and the units digit assigned to any location is the number of its row location;
(C) wherein each tens conductor is connected in multiple to the said first contact of every contact pair in the correspondingly numbered level;
(D) wherein each units conductor is connected in multiple to the said second contact of every contact pair in the correspondingly numbered row;
(E) and, wherein said ascertaining means ascertains which tens conductor and which units conductor has said signal thereon, thereby to ascertain the two-digit number of said calling line terminal location.

8. The invention defined in claim 7:
(A) wherein said first and second contacts of a contact pair comprise respective lower and upper bank contacts insulatedly supported with respect to each other in said bank;
(B) wherein said wiper pair comprises respective lower and upper wipers insulatedly supported with respect to each other in said wiper assembly;
(C) wherein each tens conductor is multipled to each lower bank contact in the corresponding bank level;
(D) and, wherein each units conductor is multipled to each upper bank contact in the corresponding bank row.

9. The invention defined in claim 1:
(A) wherein said finder terminal bank comprises at least one other pair of bank contacts per terminal location;
(B) wherein a first contact of said other pair comprises a first line termination and the second contact of said other pair comprises a second line termination so that any bank terminal location can terminate two lines;
(C) wherein said wiper assembly includes at least one other pair of wipers adapted to make contact with said other pair of bank contacts whenever said one pair of wipers is in contact with said one pair of contacts;
(D) wherein said finder circuitry includes means controlled incident to the finding of a calling line termination for identifying which of said first and second lines of the found line terminal location is the calling line;
(E) and, means controlled by said identifying means for denoting which of said first and second lines is identified by the calling line terminal location number ascertained by said ascertaining means.

10. The invention defined in claim 9:

(A) wherein said identity number is a two-digit number;

(B) wherein each line termination at any particular bank location is assigned a three-digit number including the two-digit bank location number and a different third digit for each of the two lines terminating at the same bank location;

(C) wherein said group of conductors comprises (1) a first set of conductors of which at least one selected conductor is connected to a first contact of each said selected one contact pair according to a first digit (2) and a second set of conductors of which at least one selected conductor is connected to the second contact of each said selected one contact pair according to a second digit;

(D) wherein said ascertaining means ascertains the two-digit number of said calling line terminal location by ascertaining to which conductors of said sets thereof said signal is applied;

(E) and, wherein said denoting means denotes the third digit of the calling line termination.

11. The invention defined in claim 10:

(A) wherein said finder terminal bank has one hundred terminal locations to each of which is assigned a different number from 00 to 99;

(B) wherein the three-digit number of any line termination is X00 to X99 or Y00 to Y99 depending upon whether the calling line is respectively a first or a second line termination;

(C) wherein said first set of conductors comprises ten tens conductors, each connected to a said first contact of each said one contact pair having the same corresponding tens digit;

(D) wherein said second set of conductors comprises ten units conductors, each connected to the second contact of each said one contact pair having the same corresponding units digit;

(E) wherein said ascertaining means ascertains which tens and units conductors have said signal applied thereto;

(F) and, wherein said denoting means denotes which of X and Y is the hundreds digit of the calling line termination.

12. The invention defined in claim 11:

(A) wherein said one hundred terminal locations are arranged in ten horizontal levels 1 through 0 (ten) and in ten vertical rows 1 through 0 (ten);

(B) wherein the tens digit assigned to any location is the number of its level location and the units digit assigned to any location is the number of its row location;

(C) wherein each tens conductor is connected in multiple to the said first contact of every said one contact pair in the correspondingly numbered level;

(D) wherein each units conductor is connected in multiple to the said second contact of every said one contact pair in the correspondingly numbered row;

(E) and, wherein said ascertaining means ascertains which tens conductor and which units conductor has said signal thereon, thereby to ascertain the two-digit number of said calling line terminal location.

13. The invention defined in claim 12:

(A) wherein said first and second contacts of a said one contact pair comprise respective lower and upper bank contacts insulatedly supported with respect to each other in said bank;

(B) wherein said first and second contacts of said other contact pair comprise respective lower and upper bank contacts insulatedly supported with respect to each other in said bank;

(C) wherein said one wiper pair and said other wiper pair each comprises respective lower and upper wipers insulatedly supported with respect to each other in said wiper assembly;

(D) wherein each tens conductor is multiplied to each lower bank contact of each said one contact pair in the corresponding bank level;

(E) wherein each units conductor is multiplied to each upper bank contact of each said one contact pair in the corresponding bank row;

(F) and, wherein the said identifying means of said finder circuitry comprises the said other pair of wipers.

14. The invention defined in claim 13:

(A) wherein a plurality of said line finders is provided as a line finder group to serve the same calling lines;

(B) wherein each line terminates in multiple to a bank location in each finder of the group;

(C) and, wherein said signal applying means includes transmission control means in said finder to allow effective transmission of said signal in the direction from the source thereof to said one pair of wipers and to prevent effective transmission of said signal in the reverse direction.

15. The invention defined in claim 14 wherein said transmission control means comprises impedance in series with said one pair of wipers, said impedance exhibiting a substantial and effective difference in impedance to flow in opposite directions therethrough of signals.

16. The invention defined in claim 15 wherein said impedance comprises a propely poled diode in series with each of said one pair of wipers.

References Cited

UNITED STATES PATENTS 2,300,829 11/1942 Gooderham.

KATHLEEN H. CLAFFY, Primary Examiner

T. W. BROWN, Assistant Examiner